United States Patent
Hecker

(10) Patent No.: US 6,997,506 B2
(45) Date of Patent: Feb. 14, 2006

(54) DECK FOR A SERVICE VEHICLE

(75) Inventor: Paul C. Hecker, Garner, IA (US)

(73) Assignee: Iowa Mold Tooling Co., Inc., Garner, IA (US)

( * ) Notice: Subject to any disclaimer, the term of this patent is extended or adjusted under 35 U.S.C. 154(b) by 418 days.

(21) Appl. No.: 10/372,494

(22) Filed: Feb. 21, 2003

(65) Prior Publication Data

US 2004/0165977 A1    Aug. 26, 2004

(51) Int. Cl.
*B62D 25/20* (2006.01)

(52) U.S. Cl. .............................. 296/184.1; 296/193.07; 414/339; 414/543

(58) Field of Classification Search ............. 296/184.1, 296/193.07, 204; 414/339, 543
See application file for complete search history.

(56) References Cited

U.S. PATENT DOCUMENTS

| | | | | |
|---|---|---|---|---|
| 2,841,415 A | * | 7/1958 | Black ...................... 296/184.1 |
| 4,695,087 A | * | 9/1987 | Hollrock ................... 296/186.4 |
| 4,790,710 A | * | 12/1988 | Ayalon ........................ 414/543 |
| 6,834,911 B1 | * | 12/2004 | Schillinger et al. .... 296/193.07 |
| 6,893,076 B1 | * | 5/2005 | Lewis ...................... 296/184.1 |
| 2003/0047964 A1 | * | 3/2003 | Jurica et al. ................ 296/183 |

* cited by examiner

*Primary Examiner*—Lori L Coletta
(74) *Attorney, Agent, or Firm*—Wood, Phillips, Katz, Clark & Mortimer

(57) ABSTRACT

Vehicle payload in a service vehicle including a vehicle chassis having two spaced frame members (50) with a generally horizontal deck (16) mounted on the frame members for receiving and carrying a load to be transported and which extends to either side of a vehicle centerline (48) and which is provided with a crane (28) located to one side of the centerline is achieved in a lightweight, torsionally resistant deck structure including a horizontal plate (44) together with at least two spaced, elongated box beams (46) supporting the plate (44) which extend longitudinally of the center line (48) together with a plurality of cross members (64) secured to and extending between the box beams (46).

14 Claims, 3 Drawing Sheets

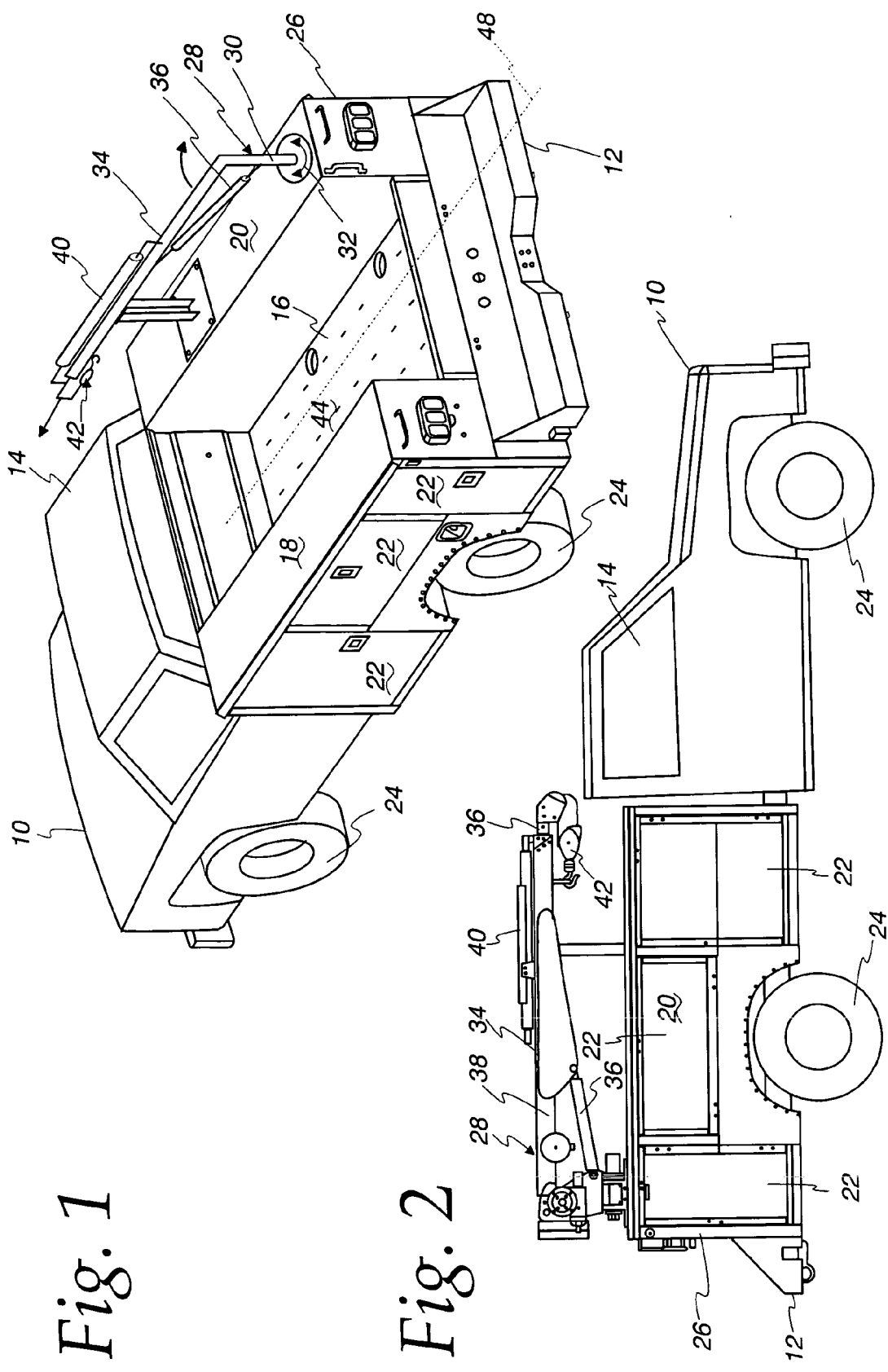

DECK FOR A SERVICE VEHICLE

FIELD OF THE INVENTION

This invention relates to service vehicles, and more particularly, to an improved deck for use in such vehicles.

BACKGROUND OF THE INVENTION

So-called service vehicles are well known and utilized in many fields. Typically, the service vehicle is a truck having a forward cab and an open, rear deck flanked by side compartments. Such vehicles are utilized by, for example, utilities in servicing electrical distribution systems as well as telephone lines. They are also employed by mechanics who are required to travel to remote sites to perform mechanical work on equipment located at such sites requiring maintenance and/or repair. Service trucks are also utilized by the tire industry in servicing off the road vehicles at remote locations, agricultural equipment such as tractors, and even servicing the tires on vehicles where the tires have blown or otherwise deflated at a location sufficiently remote from a fixed tire servicing location that the vehicle cannot be moved thereto for tire servicing.

In the usual servicing operation, the deck is used as a support for equipment to be utilized in the servicing operation. For example, utilities may place electrical transformers, rolls of cable, etc., on the deck of the service vehicle for transportation to a point of use. Similarly, mechanics may place repair parts on the deck while tire servicing operations will typically transport tires and/or wheels on the deck.

Many of these articles are extremely heavy and difficult to load and unload from the deck. Moreover, in some cases, as in utility applications, it may be necessary to lift a piece of equipment to a relatively high location on a utility pole or the like. As a consequence of this, many of these vehicles are provided with small cranes for loading and unloading the deck as well as lifting equipment to a point of use. The crane will typically be mounted right behind the cab or, in the case of medium or light duty service vehicles, near the rear of the vehicle on the right side thereof. Conventionally, the crane will be rotatable about a vertical axis and have an extendable boom which may or may not additionally be articulated. In any event, when the crane is being utilized to move a load, the right rear location of the point of attachment of the crane to the vehicle imparts substantially torsional and lateral stress to the deck of the vehicle which can ultimately lead to fatigue of the deck and/or its supporting structure and ultimately, require replacement thereof.

Heretofore, the problem of fatigue due to torsional and/or lateral loading has been solved by utilizing what amounts to oversize structural members of sufficient mass to provide a high degree of resistance to fatigue due to the undesirable loading characteristics. While this solution works for its intended purpose, it has one major drawback.

As is well known, vehicles are designed with a maximum gross vehicle weight in mind. In the case of service vehicles, the maximum gross vehicle weight includes not only the weight of the vehicle itself, but the weight of operators as well as the weight of material being transported by the vehicle. Consequently, where torsional, lateral and axial loading resistance is provided by oversizing frame members in the service body, there is a consequent increase in the weight of the service body. This, in turn, reduces the payload that the vehicle may carry and still be within its maximum gross weight limit.

The present invention is directed to solving one or more of the above problems.

SUMMARY OF THE INVENTION

An exemplary embodiment of the invention achieves the foregoing object in a service vehicle including a vehicle chassis have two spaced frame members extending longitudinally of the vehicle, with one on each side of the longitudinal centerline of the vehicle. Ground engaging means are located on the chassis so that the vehicle may traverse the underlying terrain and a generally horizontal deck is mounted on the chassis for receiving and carrying a load to be transported. The deck extends laterally to each side of the centerline. A loading/unloading apparatus is mounted on the vehicle at a location to one side of the centerline. The loading/unloading apparatus is utilized to place a load on the deck or remove it from the deck.

The invention contemplates the improvement wherein the deck includes a generally horizontal plate defining an upper deck surface and at least two spaced, elongated box beams supporting the plate and extending longitudinally of the centerline generally parallel and in proximity to a respective one of the frame members and secured thereto. A plurality of cross braces are secured to and extend between the box beams below the plate at spaced locations along the centerline. The loading/unloading apparatus is secured to the deck on one side of the centerline at a location on the opposite side of one of the box beams from the centerline.

In a preferred embodiment, the box beams are quadrilateral in cross section and the plate forms an upper side of both of the box beams.

In a highly preferred embodiment, each quadrilateral is a trapezoid and the plate forms a major base thereof and a minor base of the trapezoid is mounted to an upper surface of a corresponding one of the frame members.

In a highly preferred embodiment, each trapezoid is a right trapezoid having one side wall at right angles to both of the bases of the trapezoid and shear plates are mounted to the one side wall of both of the box beams and depend downwardly therefrom into proximity with one side of a corresponding one of the frame members and is secured thereto. Preferably, both the one side wall and the frame member one side are remote from the centerline.

In a preferred embodiment, the shear plates are located at both fore and aft locations on the box beams.

One embodiment of the invention contemplates the use of a gusset plate extending laterally from a box beam on the one side of the centerline to a location below the loading/unloading apparatus to support the same.

In one embodiment of the invention, the location below the loading/unloading apparatus is past a side of the plate on the centerline one side.

In a highly preferred embodiment, the location below the loading/unloading apparatus is adjacent the rear of the vehicle.

In a highly preferred embodiment, tool/storage compartments are located on two opposite sides of the deck. Preferably, the loading/unloading apparatus is a crane having an upright, pivotal mast and an extendable boom mounted on the mast.

In one embodiment of the invention, each of the box beams includes a flat bottom wall and two side walls extending generally upwardly from opposite edges of the flat bottom wall. The one of the side walls remote from the centerline is substantially vertical and the other of the side walls nearest the centerline extends upwardly at an obtuse angle from the flat bottom wall toward the centerline. Both of the side walls are secured to the underside of the plate. The cross braces extend generally horizontally between the other side walls of the box beams, that is, between the side walls closest to the centerline at spaced intervals along the length of the box beams. A gusset plate is secured to one of the box beams side wall remote from the centerline and extends generally horizontally away from the centerline to the loading/unloading apparatus location to support the loading/unloading apparatus.

A highly preferred embodiment contemplates that the side walls of the box beams, at their upper edges, terminate in horizontally, oppositely directed flanges abutting and welded to the deck plate.

Other objects and advantages will become apparent from the following specification taken in connection with the accompanying drawings.

BRIEF DESCRIPTION OF THE DRAWINGS

FIG. 1 is a perspective view of a service vehicle made according to the invention taken from the upper left rear thereof;

FIG. 2 is a right side elevation of the vehicle;

DETAILED DESCRIPTION OF THE PREFERRED EMBODIMENT

Figure 3:
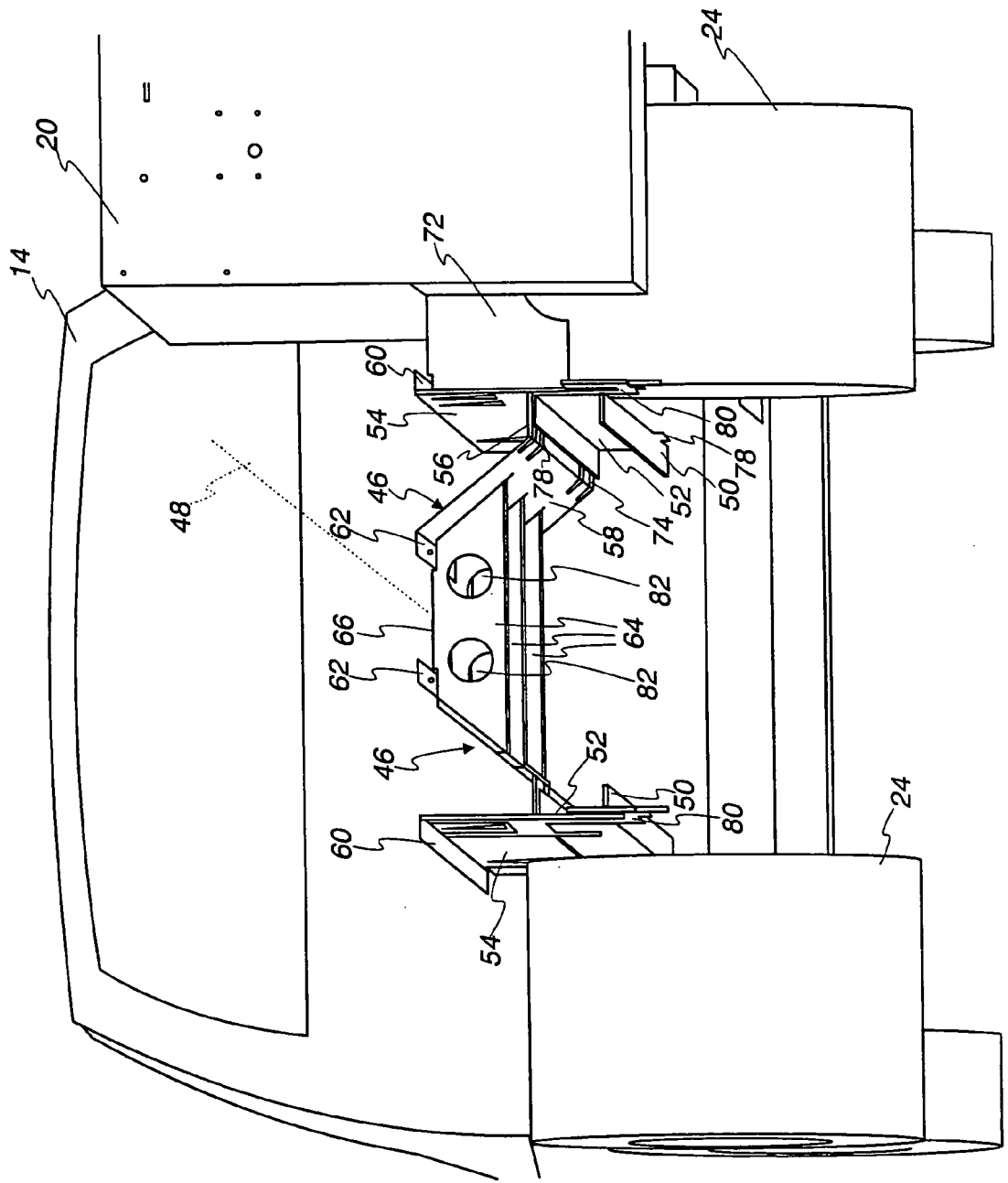
FIG. 3 is a perspective view taken from the lower left rear of the vehicle with a tool compartment and the deck plate removed for clarity.

An exemplary embodiment of a service vehicle having an improved deck made according to the invention is illustrated in FIGS. 1 and 2 and with reference thereto, the vehicle includes a forward end 10 and a rear end 12. Near the forward end is an operator cab 14 and extending from the cab 14 to the rear end 12 is a load carrying deck 16. The deck 16 is flanked by a left side compartment 18 and a right side compartment 20. The compartments 18 and 20 are typically tool and/or storage compartments and include a plurality of access panels 22. The access panels are conventional and may be opened to achieve access to tools, small parts, etc. stored within the compartments 18 and 20. It is to also be noted that in some cases, other materials may be stored in the compartments 18,20. For example, one or more of the compartments 18,20 could contain reservoirs for fluids used in servicing as, for example, lubricants.

The vehicle is provided with wheels that engage the underlying terrain so that a vehicle can move from one location to another. However, it is to be noted that the invention is not limited to use with wheeled vehicles. Rather, the same may be used with efficacy in any type of vehicle having a ground engaging instrumentality whereby the vehicle may traverse the underlying terrain.

As seen in FIGS. 1 and 2, near the right rear corner 26 of the vehicle, a loading/unloading apparatus, generally designated 28 is mounted to the vehicle. In the illustrated embodiment, the loading/unloading apparatus 28 is a crane having an upright mast 30 that is pivotal about a vertical axis as indicated by a bidirectional arrow 32. Pivoted to the upper end of the mast 30 is an extendable boom 34 which may be raised or lowered by a hydraulic cylinder 36. In addition, the boom 34 has an inner boom 36 which is telescoped within an outer boom 38 and which may be extended therefrom by means of a hydraulic cylinder 40. A cable and hook assembly, generally designated 42, is associated with the extendable boom 34 for engaging a load to be moved.

It is to be noted that the crane 28 is conventional and it's details form no part of the invention except to the extent that they relate to features of the deck 16 to be described in greater detail hereinafter.

Figure 5:
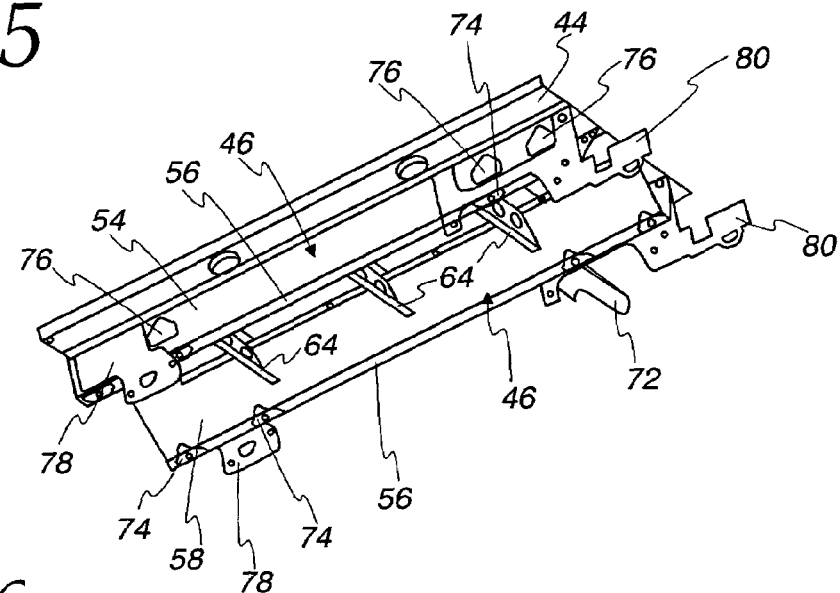
FIG. 5 is a perspective view of the deck structure taken from the lower left rear thereof.
Figure 6:
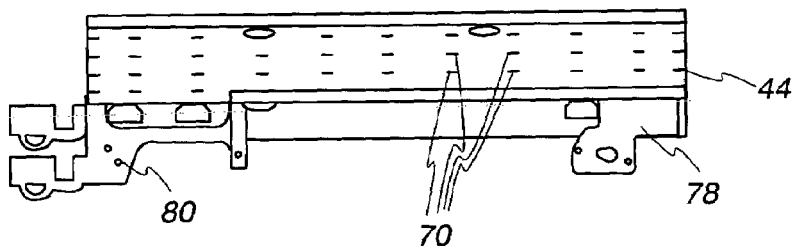
FIG. 6 is a perspective view of the deck structure taken from above the deck surface and from the right side thereof.

The construction of the deck 16 will now be described. As seen in FIGS. 1, 5 and 6, the deck 16 includes an upper plate 44 which typically will include nonslip embossments such as a diamond-shaped pattern (not shown) on its upper surface.

Figure 4:
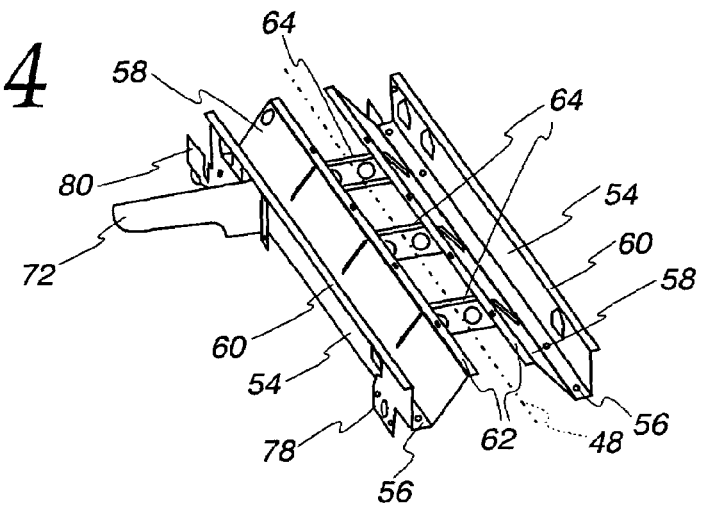
FIG. 4 is a perspective of the deck structure removed from the vehicle and taken from the upper front right thereof with the deck plate removed for clarity.

Referring to FIGS. 3, 4 and 5, supporting the deck plate 44 is a pair of elongated box beams, each generally designated 46. The approximate longitudinal centerline of the vehicle is designated 48 in FIGS. 3 and 4 and it will be seen that there is one of the box beams 46 on each side of the centerline 48. The box beams 46 are mirror images of one another and extend longitudinally of the vehicle and are parallel with the centerline 48. As seen in FIG. 3, the vehicle chassis includes two elongated, C-shaped channel frame members 50 whose vertical sides 52 are remote from the centerline 48. That is to say, the frame members 50 open toward the centerline 48.

The box beams 48 have a trapezoidal cross section. Specifically, the cross section is of a right trapezoid such that the side wall 54 most remote from the centerline 48 extends vertically from a bottom wall 56 forming the minor base of the right trapezoid. A side wall 58 extends upwardly from the opposite edge of the base 56 from which the wall 54 extends at an obtuse angle toward the centerline 46. Both of the walls 54 and 58 terminate in horizontal, oppositely directed flanges 60 and 62 respectively. At intervals along the length of the box beams 46, cross braces 64 are located. The cross braces 64 extend between the sides 58 of the box beams 46 and include flanges 66 on their upper edges between the flanges 62.

The deck plate 44 forms the upper wall of each of the box beams 46 and to that end, the deck plate 44 is welded to the flanges 60,62 of both box beams 46 as at locations shown at 70 in FIG. 6, for example.

As best seen in FIGS. 3, 4 and 5, a gusset plate 72 extends from the right side box beam 46 away from the centerline 48 laterally to a location underlying the mast 30 to support the base of the crane 28 in any suitable fashion.

In some instances, spacer plates 74 may be secured, as by welding, to the minor base or bottom wall 56 of each of the box beams 46. The spacer plates 74 are provided with apertures (not numbered) which may fit about the heads of bolts (not shown) or rivets in the frame members 50. To achieve a material savings, the spacers 74 may be cut out of the side walls 54 of the box beams 46 at relatively stress-free locations such as illustrated at 76.

To complete the assemblage, conventional shear plates 78,80 are located at the forward and rear ends of each side wall 54 of each box beam 46. Conventional fasteners are employed to secure the shear plate to the vertical side 52 of the frame members 50 on their sides remote from the centerline 48.

A number of advantages accrue from the foregoing construction. For one, the bed plate 44 is fully supported along its length. The diverging the nature of the side walls 54,58 of the box beams 46 allows the points of attachment provided by the weld 70 to be located relatively uniformly from side to side across the length of the plate 44. Further, the upper flanges 66 (FIG. 3) on the cross braces 64 abut the underside of the bed plate 44 if desired and provide additional support.

Significantly, the invention allows the use of lighter gauge components in forming the deck thereby providing a vehicle with a greater payload within maximum vehicle gross weight limits. Comparisons have shown that the deck structure of the present invention weighs at least 30% less than comparable deck structure made according to conventional technology.

What is claimed is:

1. In a service vehicle including
   a chassis having two spaced frame members extending longitudinally of the vehicle, one on each side of the longitudinal centerline of the vehicle;
   ground engaging means on said chassis whereby the vehicle may traverse the underlying terrain;
   a generally horizontal deck mounted on said chassis for receiving and carrying a load to be transported and extending to each side of said centerline; and
   a loading/unloading apparatus mounted on said vehicle at a location to one side of said centerline and operable to locate on or remove from a load on said deck;
   the improvement wherein:
   said deck includes a generally horizontal plate defining an upper deck surface and at least two spaced elongated box beams supporting said plate and extending longitudinally of said centerline generally parallel and in proximity to a respective one of said frame members and secured thereto, and a plurality of cross braces secured to and extending between said box beams below said plate at spaced locations along said centerline, said loading/unloading apparatus being secured to said deck on one side of said centerline at a location on the opposite side of one of said box beams from said centerline.

2. The service vehicle of claim 1 wherein said box beams are quadrilateral in cross section and said plate forms an upper side of both said box beams.

3. The service vehicle of claim 2 wherein each said quadrilateral is a trapezoid and said plate forms a major base thereof and a minor base of said trapezoid is mounted to an upper surface of a corresponding one of said frame members.

4. The service vehicle of claim 3 wherein each said trapezoid is a right trapezoid having one side wall at right angles to both said bases, and shear plates mounted to said one side wall of both said box beams and depending downwardly therefrom into proximity with one side of a corresponding one of said frame members and secured thereto.

5. The service vehicle of claim 4 wherein both said one side wall and said frame member one side are remote from said centerline.

6. The service vehicle of claim 5 wherein said shear plates are located at both fore and aft locations on said box beams.

7. The service vehicle of claim 6 further including a gusset plate extending laterally from a box beam on said centerline one side to a location below said loading/unloading apparatus to support the same.

8. The service vehicle of claim 7 wherein said location below said loading/unloading apparatus is past a side of said plate on said centerline one side.

9. The service vehicle of claim 8 wherein said location below said loading/unloading apparatus is adjacent the rear of the vehicle.

10. The service vehicle of claim 9 further including tool/storage compartments on two opposite sides of said deck.

11. The service vehicle of claim 1 herein said loading/unloading apparatus is a crane having an upright pivotal mast and an extendable boom mounted on said mast.

12. In a service vehicle including
    two spaced frame members extending longitudinally of the vehicle, one on each side of the longitudinal centerline of the vehicle;
    ground engaging means on said chassis whereby the vehicle may traverse the underlying terrain;
    a generally horizontal deck mounted on said chassis for receiving and carrying a load to be transported and extending to each side of said centerline; and
    a loading/unloading apparatus mounted on said vehicle at a location to one side of said centerline and operable to locate on or remove from a load on said deck;
    the improvement wherein:
    said deck includes a generally horizontal plate defining an upper deck surface and at least two spaced elongated box beams supporting said plate and extending longitudinally of said centerline generally parallel and in proximity to a respective one of said frame members and secured thereto, each of said box beams including a flat bottom wall and two side walls extending generally upwardly from opposite edges of said flat bottom wall, the one of said side walls remote from said centerline being substantially vertical, the other of said side walls nearest said centerline extending at an obtuse angle from said flat bottom wall toward said centerline, both of said side walls being secured to the underside of said plate;
    cross braces extending generally horizontally between said other side walls of said box beams at spaced intervals along the length of said box beams; and
    a gusset plate secured to one of said box beams one side wall and extending generally horizontally away from said centerline to said loading/unloading apparatus location to support said loading/unloading apparatus.

13. The service vehicle of claim 12 wherein said side walls, at their upper edges, terminate in horizontal, oppositely directed flanges abutting and welded to said plate.

14. The service vehicle of claim 13 wherein each of said box beams has a front end and rear end, and further including a shear plate at each of said ends secured to said one side wall in depending relation into flanking relation with a corresponding one of said frame members and secured thereto to mount said deck on said chassis, said deck further having two side edges, one on each side of said centerline, and side compartments along each of said deck side edges and extending above said deck, said loading/unloading apparatus comprising a crane mounted on said gusset plate through one of said side compartments and having a rotatable and extendable boom above said one side compartment.

* * * * *